United States Patent [19]

Park et al.

[11] Patent Number: 5,657,250

[45] Date of Patent: Aug. 12, 1997

[54] METHOD FOR CONTROLLING OPERATION AND MANAGEMENT SUBSYSTEM IN SIGNALLING MESSAGE EXCHANGE NO. 1 SYSTEM

[75] Inventors: Nam Hoon Park, Seoul; Hyun Ju Oh, Daejeon; Sun Hee Yang, Daejeon; Byung Do Ko, Daejeon, all of Rep. of Korea

[73] Assignees: Electronics and Telecommunications Research Institute, Daejeon; Korea Telecommunication Authority, Seoul, both of Rep. of Korea

[21] Appl. No.: 479,214

[22] Filed: Jun. 7, 1995

[30] Foreign Application Priority Data

Dec. 21, 1994 [KR] Rep. of Korea ............... 94-35759

[51] Int. Cl.$^6$ .................. G06F 17/00; H04J 3/14
[52] U.S. Cl. .................. 370/359; 370/384; 370/466
[58] Field of Search ............... 370/43, 58.2, 68.1, 370/92, 99, 110.1, 360, 384, 389, 359, 419, 466, 522; 379/229, 230; 364/514 R; 395/600, 650, 850

[56] References Cited

U.S. PATENT DOCUMENTS

| | | | |
|---|---|---|---|
| 4,084,228 | 4/1978 | Dufond et al. | 395/650 |
| 5,095,529 | 3/1992 | Comroe et al. | 455/16 |
| 5,129,080 | 7/1992 | Smith | 395/575 |
| 5,388,258 | 2/1995 | Larsson et al. | 395/600 |
| 5,434,852 | 7/1995 | La Porta et al. | 370/58.2 |
| 5,541,987 | 7/1996 | Topper et al. | 379/230 |
| 5,555,295 | 9/1996 | Bhusri | 379/112 |

*Primary Examiner*—Hassan Kizou
*Attorney, Agent, or Firm*—Keck, Mahin & Cate

[57] ABSTRACT

A method for controlling an operation and management subsystem in a signalling message exchange No.1 system, the operation and management subsystem including a user interface subsystem, a target interface subsystem, an operation control subsystem, a signalling network operation system interworking subsystem, an operation and management subsystem management subsystem and a data management subsystem. The method includes the steps of when the operation and management subsystem being at an idle state receives a message from the target system, converting the message by the target interface subsystem into a format for a selected one of the subsystems of the operation and management subsystem on the basis of a module identifier value of the message and then executing a control associated with the message by the selected subsystem, while when the operation and management subsystem being at the idle state receives a message from an operation and management worksite, converting the message by the user interface subsystem into a format for a selected one of the subsystems of the operation and management subsystem on the basis of a module identifier value of the message and then executing a control associated with the message from the user interface subsystem in the selected subsystem.

1 Claim, 7 Drawing Sheets

METHOD FOR CONTROLLING OPERATION AND MANAGEMENT SUBSYSTEM IN SIGNALLING MESSAGE EXCHANGE NO. 1 SYSTEM

BACKGROUND OF THE INVENTION

1. Field of the Invention

The present invention relates to a method for controlling an operation and management subsystem in a signalling message exchange No. 1 (SMX-1) system.

2. Description of the Prior Art

The SMX-1 system is designed by Electronics and Telecommunications Research Institute (ETRI), Korea and is one of large capacity signalling message exchange systems operating in accordance with the stand-alone method. This SMX-1 system has a duplex configuration capable of not only satisfying the requirements of signalling message exchange, e.g., performance, functionality and reliability, but also achieving expanded and continued service, easy maintenance and repair and easy test. In particular, such a duplex configuration of the SMX-1 system is adapted to cope with rapidly increasing signalling message traffics and to enable a small capacity configuration required at initial stages.

Therefore, operation and management subsystems (OMSs) equipped in such complicated and variable communications systems should cope well with associated environments requiring functions of establishment, expansion, reduction, system monitoring, error detection and error recovery. Moreover, they must provide a user interworking function, thereby enabling the user to more easily check the overall system. In addition, the OMSs should have a configuration enabling interprocess communications between user and system using simple languages and generation and processing of output messages with the easily readable form.

SUMMARY OF THE INVENTION

Therefore, an object of the invention is to provide a method for controlling OMSs in an SMX-1 system, capable of satisfying the above-mentioned requirements and reflecting the features of the SMX-1 system as much as possible.

In accordance with the present invention, this object is accomplished by providing a method for controlling an operation and management subsystem in a signalling message exchange No. 1 system, the operation and management subsystem including a user interface subsystem, a target interface subsystem, an operation control subsystem, a signalling network operation system interworking subsystem, an operation and management subsystem management subsystem and a data management subsystem, comprising the steps of: (a) when the operation and management subsystem being at an idle state receives a message from the target signalling message exchange No. 1 system, converting the message by the target interface subsystem into a format for a selected one of the subsystems of the operation and management subsystem on the basis of a module identifier value of the message; (b) when the identifier value is determined to be 1 at the step (a), formatting the message from the target interface subsystem by the signalling network operation system interworking subsystem into a form compatible with a signalling network operations system and then outputting the resultant message; (c) when the identifier value is determined to be 0 at the step (a), formatting the message from the target interface subsystem by the operation control subsystem into a form compatible with a database equipped in the operation control subsystem, and then storing the resultant message in the database; (d) when the identifier value is determined to be 2 at the step (a), formatting the message from the target interface subsystem by the user interface subsystem into a form for a printer or for a user, and then outputting the resultant message; (e) when the operation and management subsystem being at the idle state receives a message from an operation and management worksite, converting the message by the user interface subsystem into a format for a selected one of the subsystems of the operation and management subsystem on the basis of a module identifier value of the message; (f) when the identifier value is determined to be 0 at the step (e), transferring a control associated with the message from the uses interface subsystem to the data management subsystem via the operation control subsystem, and then retrieving data of the database by the data management subsystem; (g) when the identifier value is determined to be 3 at the step (e), monitoring a current of the operation and management subsystem by the operation and management subsystem management subsystem, and then executing a processing associated with the message from the user interface subsystem; (h) when the identifier value is determined to be 4 at the step (e), transferring the control associated with the message from the user interface subsystem to the target interface subsystem, and then transmitting the message to target system via a highway interface unit board; and (i) when the identifier value is determined to be 1 at the step (e), transferring the control associated with the message from the user interface subsystem to the signalling network operation system interworking subsystem, formatting the message into a form compatible with the signalling network operation system interworking subsystem, and then outputting the resultant message.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
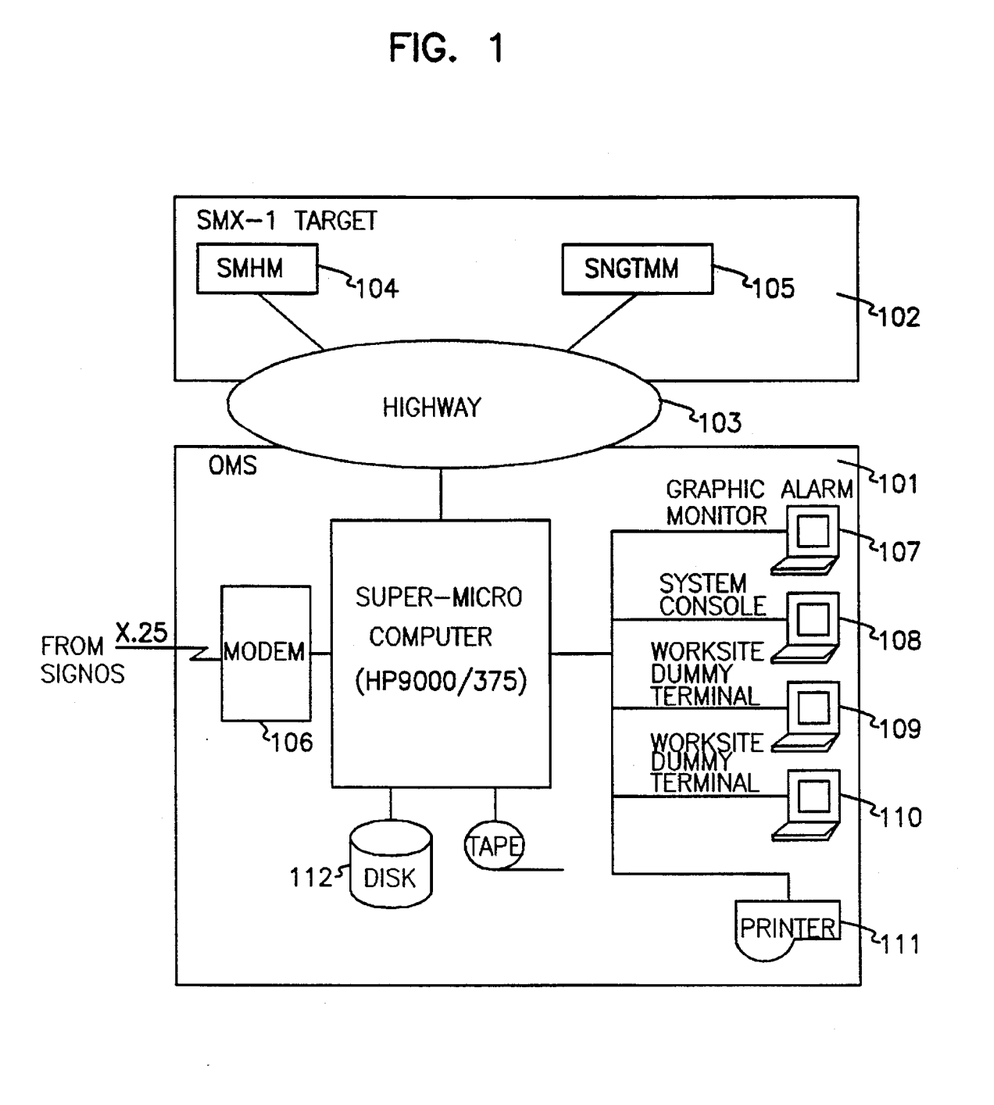
FIG. 1 is a block diagram illustrating the hardware configuration of the SMX-1 system to which the present invention is applied.

FIG. 1 illustrates the hardware configuration of the SMX-1 system to which the present invention is applied. Referring to FIG. 1, an operation and management subsystem (OMS) 101 is shown as being connected to the SMX-1 target system, denoted by the reference numeral 102, via a subsystems interconnection subsystem 103 referred to as "highway".

The SMX-1 target system 102 consists of a signalling message handling module (SMHM) 104 and a signalling network and global test maintenance module (SNGTMM) 105. The OMS 101 comprises a super-micro computer. For example, the OMS 101 may be an HP-UX-based super-micro computer. To this super-micro computer, several monitors and dummy terminals (in the illustrated case, only four units 107, 108, 109 and 110 are shown) are connected. Also, a printer 111 is connected to the super-micro computer in order to output messages received from the target system 102.

For a signalling network maintenance, the super-micro computer is connected to a signalling network operations system (SIGNOS) via a modem 106. The OMS 101 utilizes a database system 112 called "Allbase" to store and retrieve messages.

Figure 2:
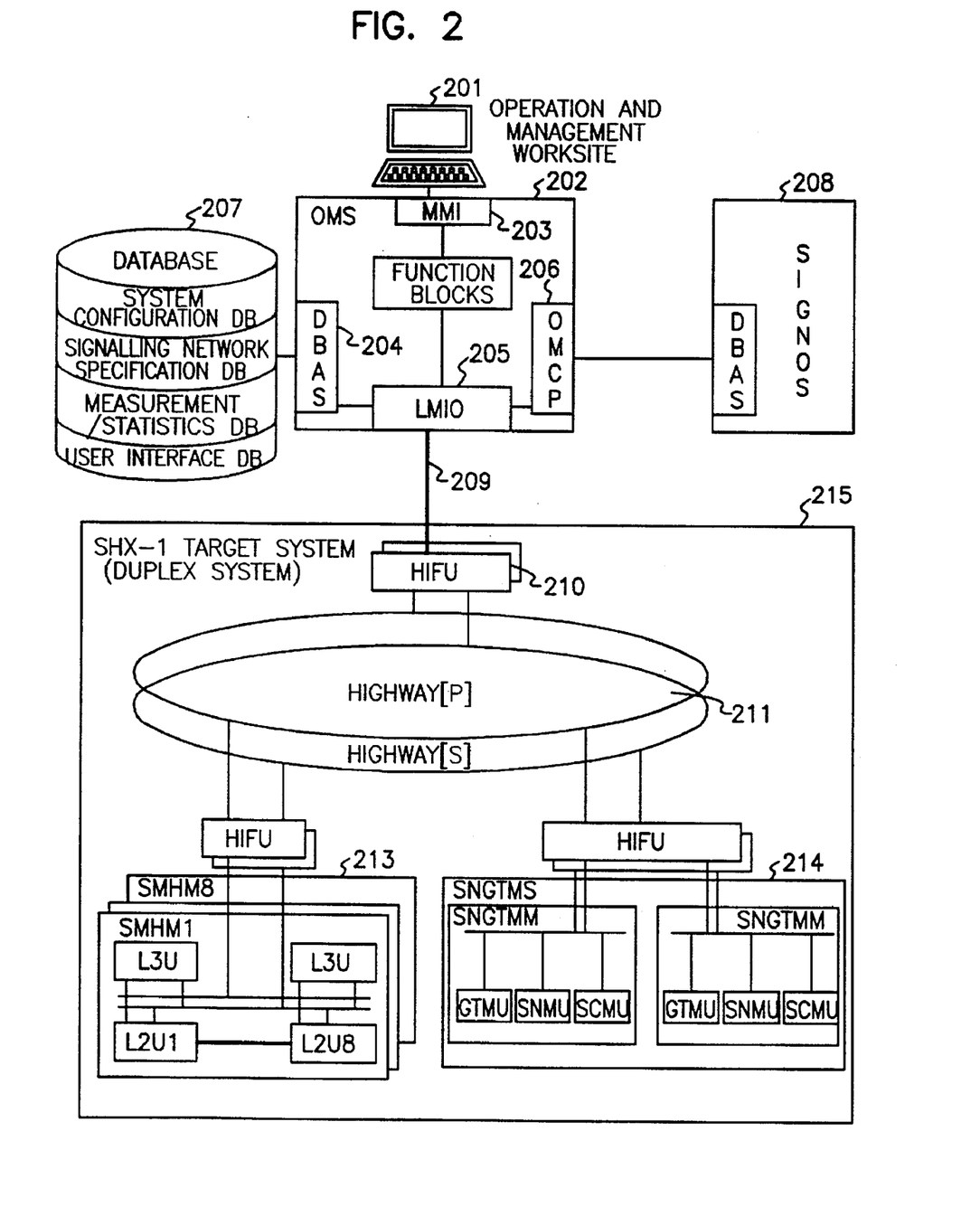
FIG. 2 is a block diagram illustrating detailed connection configuration of the OMS to a target system.

FIG. 2 illustrates detailed connection configuration of the OMS to a target system. As shown in FIG. 2, the target system which is denoted by the reference numeral 215 has a lower architecture including a signalling message handling module (SMHM) 213 having a duplicated architecture and a signalling network global test and maintenance module (SNGTMM) 214 having a duplicated architecture. These modules 213 and 214 are connected to a high-speed connection network, namely, highway 211 by highway interface unit (HIFU) boards 212 respectively so that they can receive and transmit messages with respect to the target system 215. In order to transmit messages processed by the modules 213 and 214, the target system 215 is connected to a low level protocol message I/O (LMIO) process 205 of the OMS, denoted by the reference numeral 202, via an HIFU board 210.

In the OMS 202, many daemon processes and transient processes exist to perform OMS functions. Accordingly, input and output parts of the OMS 202 may be mainly classified, in terms of function, into four processes, namely, a man-machine interface (MMI) process 203 having a function to make user at an operation and management worksite easily access to the system, a database administration block (DBAB) process 204 having a function to easily administrate a database system (207) for managing a variety of data to be stored, retrieved and changed, and an operations message communication protocol (OMCP) process 206 associated with a protocol for controlling operation and management fox an operative connection of OMS 202 to the SIGNOS 208, together with the LMIO process 205 for enabling the connection of OMS 202 to the target system 215.

Figure 3:
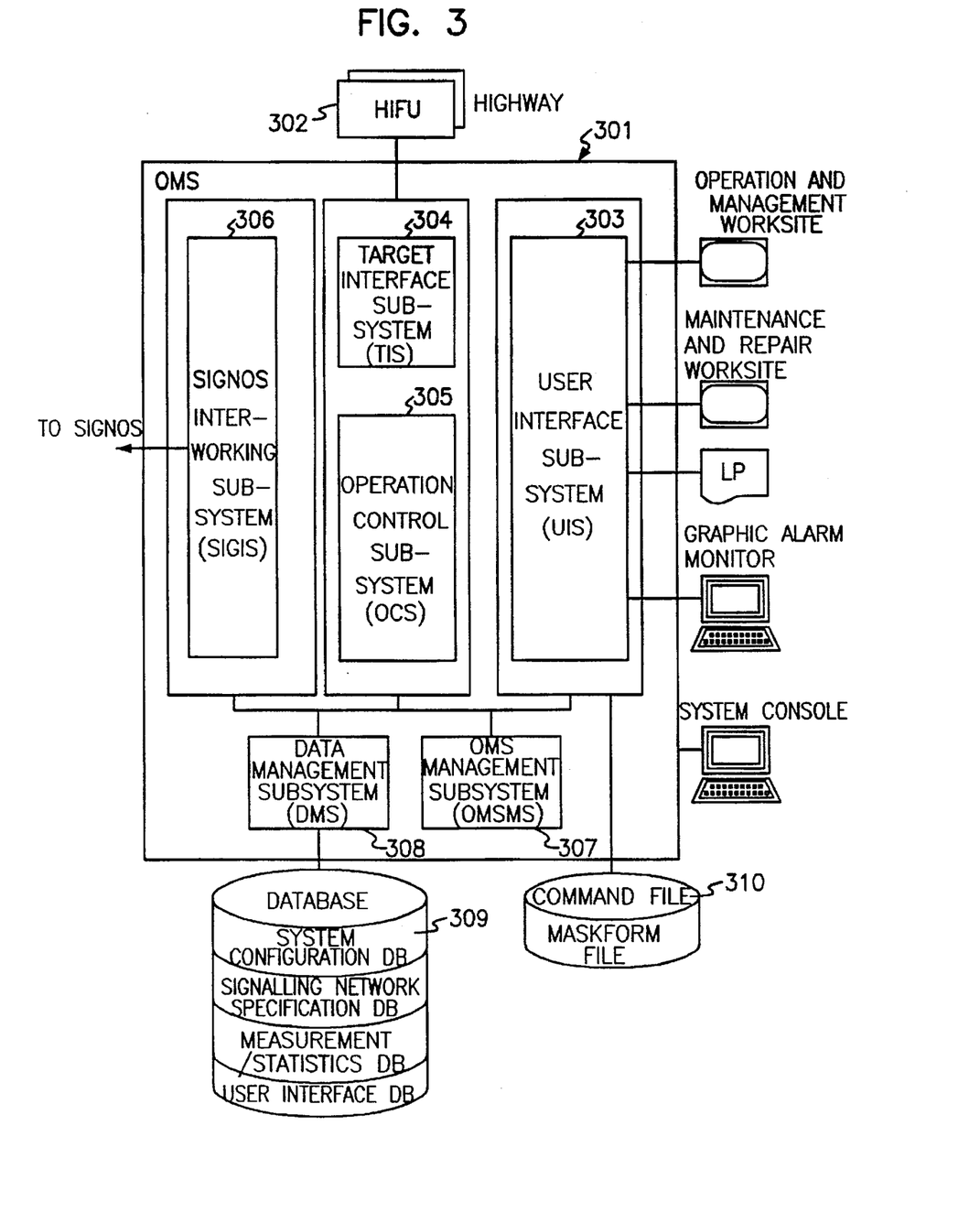
FIG. 3 is a block diagram illustrating detailed configuration of the OMS to which the present invention is applied.

FIG. 3 illustrates detailed configuration of the OMS to which the present invention is applied. The OMS, which is denoted by the reference numeral 301, is connected to a target system, namely, SMX-1 system by a highway 302. The OMS 301 consists of six subsystems, namely, a user interface subsystem 303, a target interface subsystem 304, an operation control subsystem 305, a SIGNOS interworking subsystem 306, an OMS management subsystem 307 and a data management subsystem 308.

The user interface subsystem 303 executes functions for providing the facility to users. That is, the user interface subsystems 303 provides functions associated with operation and management worksites, maintenance and repair worksites, a printer, a graphic alarm monitor for displaying fault and alarm and a system console. All input and output commands associated with the user interface subsystem 303 are handled by a command file 310.

The target interface subsystem 304 is connected to an HIFU including HIFU boards HIFU[P] and HIFU[S]. During the system is in service, the target interface subsystem 304 is usually connected to the HIFU boards HIFU[P]. At this time, the other boards HIFU[S] are at a standby state. Actually, the connection of the target interface subsystem 304 at a moment is achieved only by one of the HIFU boards HIFU[P]. At the moment that a fault is generated in the system, the connection is switched so that it is achieved by one of the standby HIFU boards HIFU[S].

The operation control subsystem 305 has a function to process, store and handle, in the form of messages compatible with the OMS 301, all commands and messages received from the operation and management worksites and the target interface subsystem 304.

The SIGNOS interworking subsystem 306 serves to support an operative connection of the OMS 301 to a SIGNOS. To this end, the SIGNOS interworking subsystem 306 has a function to receive and process commands from the SIGNOS or periodically report system operation results to the SIGNOS.

The OMS management subsystem 307 has a function to manage and administrate all processes, namely, daemon processes and transient processes which exist in the OMS 301. For ensuring an efficient process management, the OMS management subsystem 307 uses an interprocess communications (IPC) mechanism of the message queue system.

Finally, the data management subsystem 308 has a function to store and manage all data associated with the SMX-1 system in the form enabling change, retrieval, inputting, outputting and processing thereof for obtaining data requested from users of the OMS 301 or the SIGNOS. The data management subsystem 308 uses a database 309 stored with a variety of data about system configuration, signalling network specification, measurement/statistics and user interface.

Figure 4A:
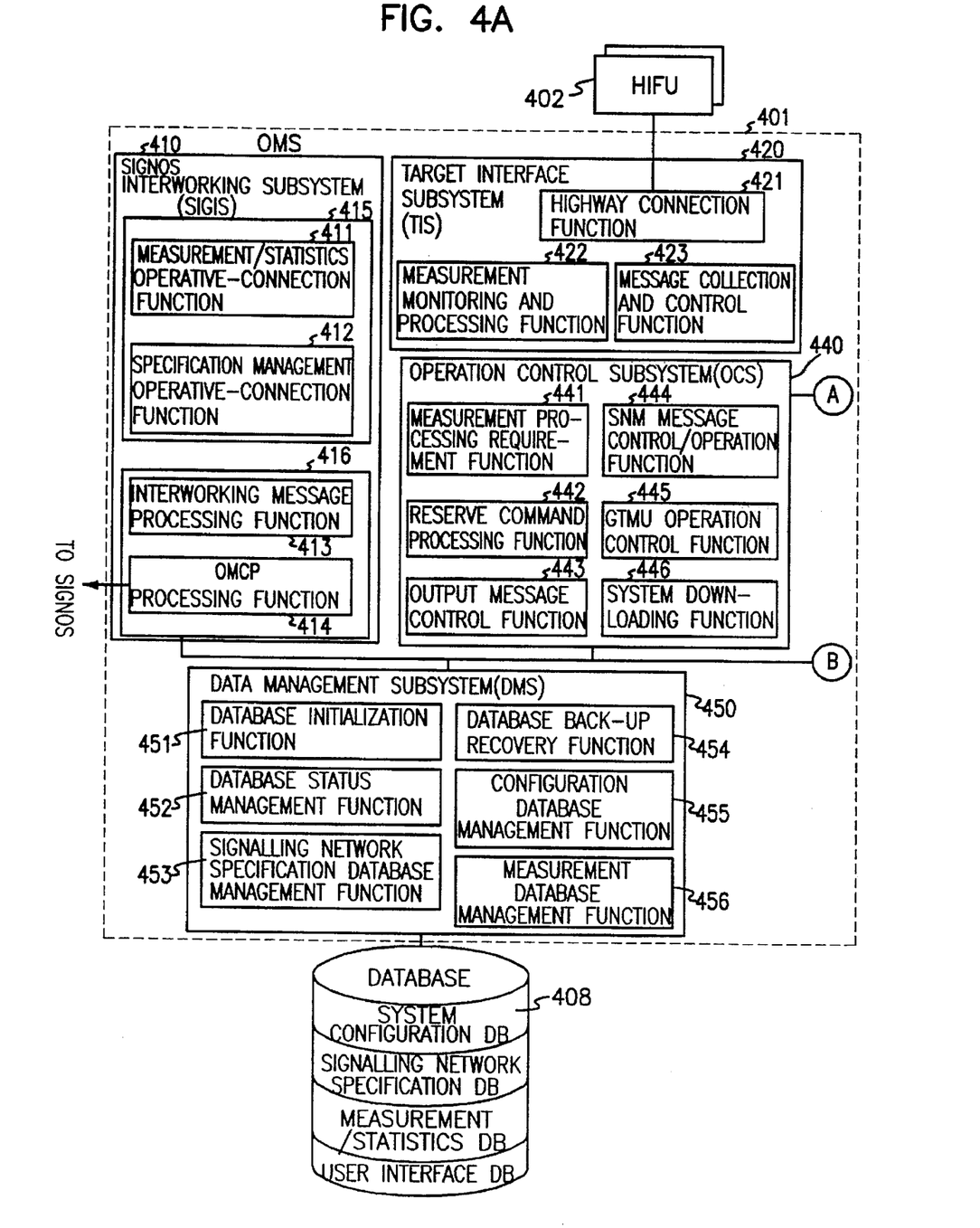
FIG. 4A and 4B are is a block diagrams illustrating logical architecture of the OMS to which the present invention is applied.
Figure 4B:
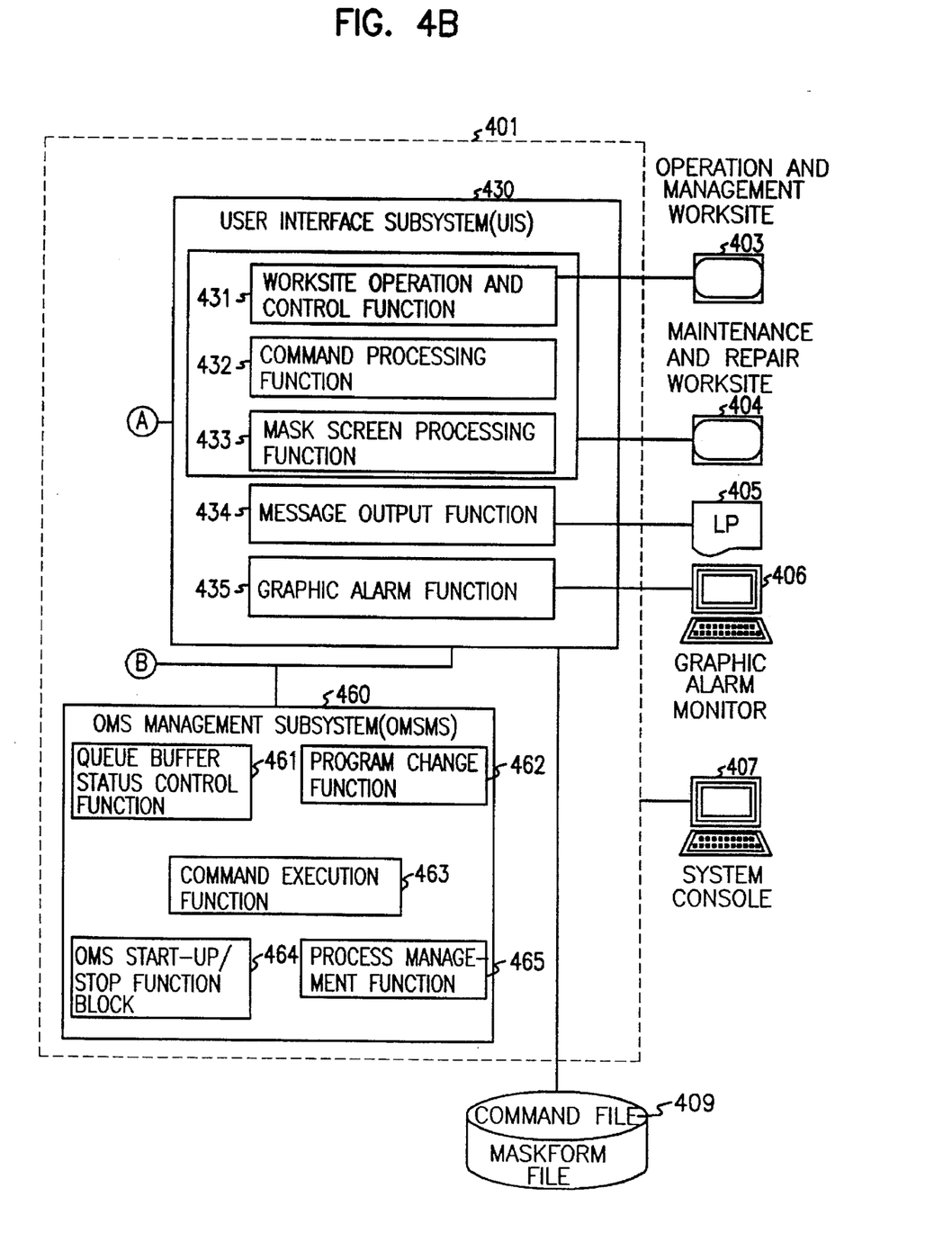

FIGS. 4A and 4B illustrate logical architecture of the OMS to which the present invention is applied.

For logically configuring the OMS executing operation and management for the SMX-1 system, functions of the OMS are mainly classified into two kinds of functions.

The first function of the OMS is the function to support efficient SMX-1 operation and maintenance/repair. This function includes an SMX-1 operation and control function, an SMX-1 signalling network specification and data administration function, system management function and a variety of user interface functions.

The second function of the OMS is the front-end function of the SIGNOS. This function includes a signalling data collection function and an SMX-1 signalling network specification and data change/control function.

Now, the logical architecture of the OMS based on the above-mentioned two basic logical functions will be described in conjunction with FIG. 4.

The OMS, which is denoted by the reference numeral 401 in FIG. 4, exchanges messages with a target system, namely, SMX-1 system via connection boards 402 such as HIFU boards.

The user interface subsystem, which is denoted by the reference numeral 430, is mainly divided into several function blocks, namely, a worksite operation and control function block 431, a command processing function block 432, a mask screen processing function block 433, a message output function block 434 and a graphic alarm function block 435.

The worksite operation and control function block 431 controls the interprocess communications between user and system through the operation and management worksite 403 or the maintenance and repair worksite 404. The command processing function block 432 makes syntax and semantic analysis of input commands. When the interprocess communications control function is required, the command processing function block 432 also determines the kind of works to be executed and sends the resultant data to the mask screen processing function block 433. For management of system history and data recovery, the command processing function block 432 also records current state and situation such as input messages, output messages user's demands in a log file 409.

The message output function block 434 collects messages related to alarm, fault and state generated during an operation of the system and then formats the collected messages again. The formatted messages are sent to a printer 405. The graphic alarm function block 435 serves to visually display a situation occurring during an operation of the SMX-1 target system. The graphic alarm function block 435 transmits all the functions being executed to the graphic alarm monitor 406 or to the system console 407.

The operation control subsystem, which is denoted by the reference numeral 420 in FIG. 4, includes a highway connection function block 421 having a function to execute connection of and control/management fox the target connection boards, namely, HIFU boards. The operation control subsystem 420 also includes a measurement monitoring and processing function block 422 and a message collection and control function block 423 in order to administrate collected messages from the target system. The measurement monitoring and processing function block 422 executes a function associated with SMX-1 target measurement data and a function to monitor measurement events. The message collection and control function block 423 collects messages generated during an operation of the system and classifies the collected messages into those of alarm, fault and state. On the basis of the content of message, the message collection and control function block 423 executes the access to database, report to SIGNOS or direct transmission of the result.

The operation control subsystem 420 also includes an operation control function block 440 for controlling all messages. In particular, the operation control function block 440 executes control for conversion of messages into the format required for the OMS and control for basic data. The operation control function block 440 includes a measurement processing requirement function block 441, a reserve command processing function block 442, an output message control function block 443, a signalling network management (SNM) message control/operation function block 444, a target global test and maintenance unit (GTMU) operation control function block 445, and a system downloading function block 446.

The SIGNOS interworking subsystem, which is denoted by the reference numeral 410 in FIG. 4, may be divided into a function block 415 related to measurement and specification and a function block 416 related to SIGNOS interworking protocol. The function block 416 related to the SIGNOS interworking protocol has an interworking message processing function block 413 and an OMCP processing function block 414 so that it converts, into the form of SIGNOS message, the resultant message obtained after processing SIGNOS commands and message received from the message collecting and processing function block and then transmits them. On the other hand, the function block 415 related to measurement and specification has a measurement/statistics operative-connection function block 411 and a specification management operative-connection function block 412 so that it controls operations associated with management, administration and control for SIGNOS message required to periodically transmit all data at the request of the SIGNOS or if desired.

The data management subsystem, which is denoted by the reference numeral 450 in FIG. 4, is the process for executing generation of driving environment of databases, initialization of databases, back-up of databases. It uses a command file stored with a series of ALLBASE/SQL commands. The data management subsystem 450 has a database application function to execute retrieval and change of data associated with the SMX-1 target system and a data execution function to execute a variety of application databases 408 including a system configuration database, a signalling network specification database, a measurement/statistics database and a user interface database. For such functions, the data management subsystem 450 includes a database initialization function block 451, a database state management function block 452, a signalling network specification database management function block 453, a database back-up recovery function block 454, a configuration database management function block 455 and a measurement database management function block 456.

The system management subsystem, which is denoted by the reference numeral 460 in FIG. 4, includes function blocks only associated with the OMS. That is, the system management subsystem 460 includes a queue buffer state control function block 461 having the function to test the rate of using queue buffers in accordance with IPC mechanism (using message queue) method, a program change function block 462 having the function to change program even when the OMS is in operation, a process management function block 463 having the function to continuously check states of various processes of OMS such as daemon processes and transient processes, an OMS startup/stop function block 464 having the function to startup and stop the processes of OMS, and a process management function block 465 having the function to manage and administrate the processes of OMS.

Figure 5A:
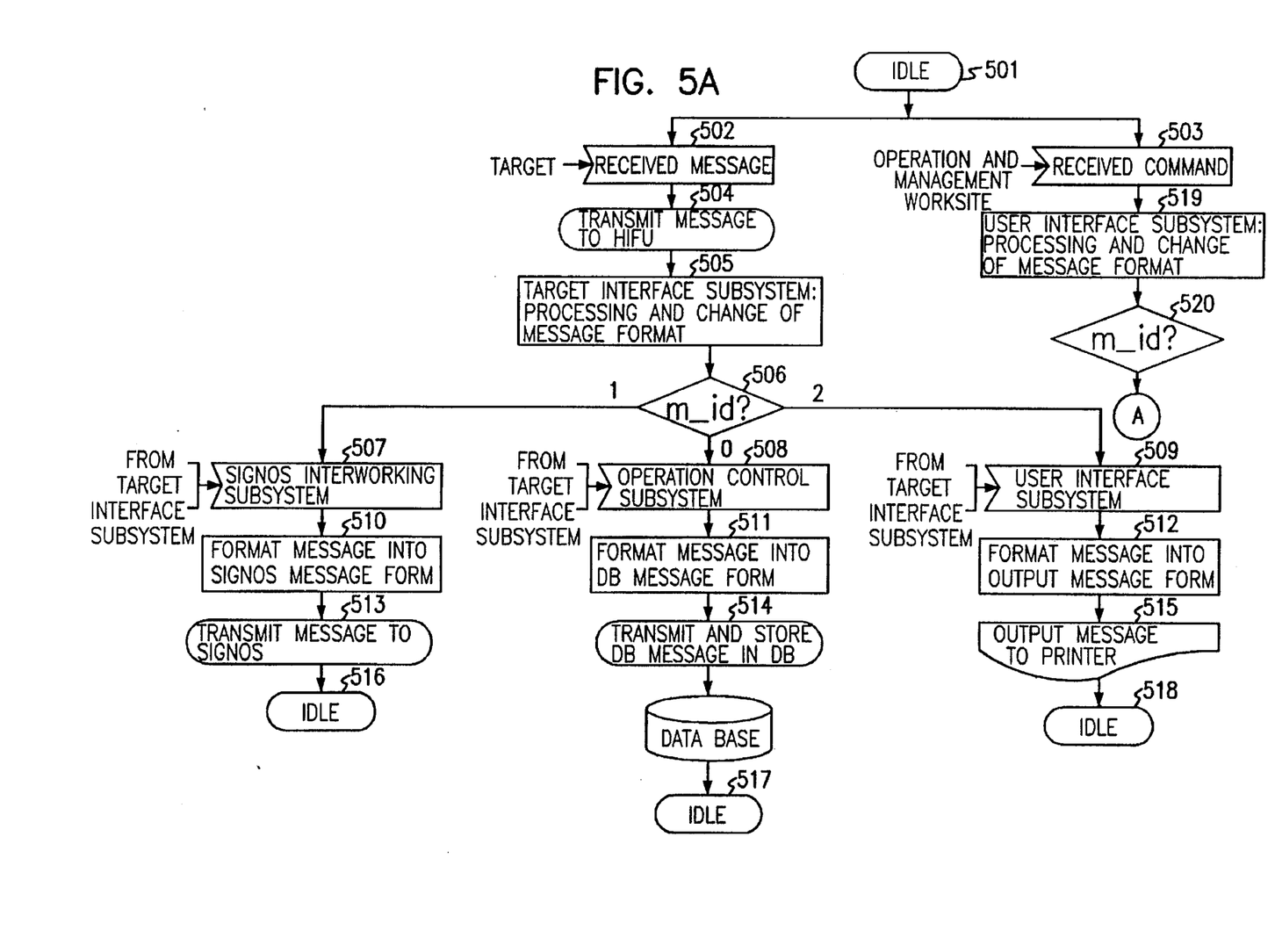
FIGS. 5A and 5B are flowcharts respectively illustrating a control method fox achieving interactive operations of the OMS shown in FIG. 3 in accordance with the present invention.
Figure 5B:
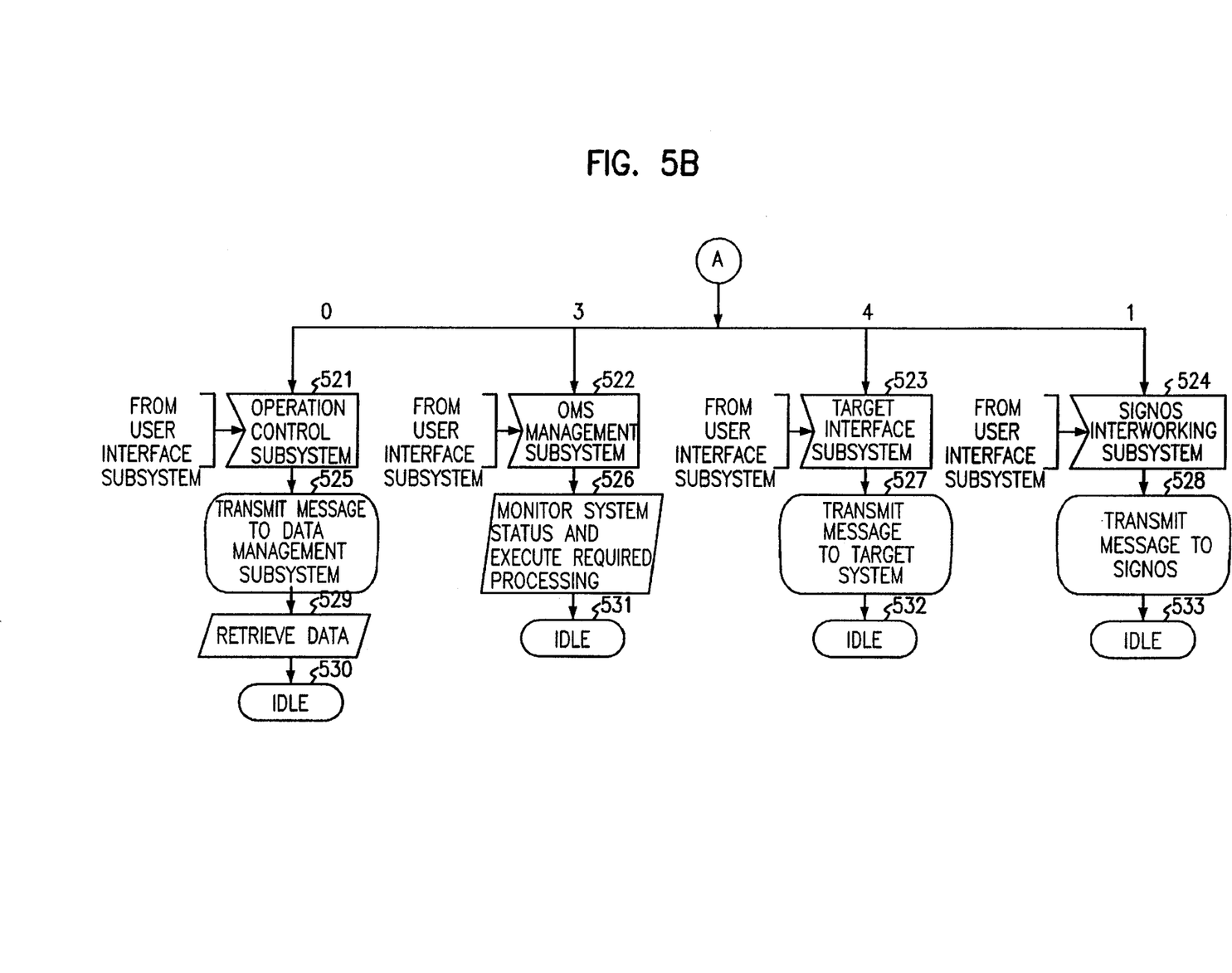

FIGS. 5A and 5B are flow charts respectively illustrating a control method for achieving interactive operations of the above-mentioned six OMS subsystems shown in FIG. 3 in accordance with the present invention.

When the OMS being at an idle state (Step 501) is powered on, it is ready to receive a message from the target system or operation and management worksite (Step 502 or 503).

Where the OMS receives a message from the target system at the step 502, the message is transmitted to the operation and management computer through the associated HIFU board 302 (Step 504). The target interface subsystem 304 of the OMS converts the received message into the format for a selected one of the subsystems of OMS on the basis of the module identifier (ID) value m_id of the message and then transmits the resultant message (Steps 505 and 506).

When the ID value m_id is 1, the message is formatted into the form compatible with the SIGNOS in the SIGNOS interworking subsystem 306 which, in turn, outputs the resultant message (Steps 510 and 513). Following the step 513, the OMS is standby at the idle state (Step 516). When the ID value m_id is 0, the message is received in the operation control subsystem 305 which, in turn, formats the received message into the form compatible with the database 309 (Steps 508 and 511). The resultant message from the operation control subsystem 305 is stored in the database 309 by the data management subsystem 308 (Step 514). Following the step 514, the OMS is standby at the idle state (Step 517).

At the ID value m_id of 2, the user interface subsystem 303 formats the received message into the form for the printer or user (Steps 509 and 512). The resultant message is then transmitted to the printer (Step 515). After completing the transmission of message, the OMS is standby at the idle state (Step 518).

On the other hand, where the OMS receives a message from the operation and management worksite at the step 503, the message is sent to the user interface subsystem 303 which, in turn, converts the message into the format for a selected one of the subsystems of OMS on the basis of the ID value m_id of the message (Steps 519 and 520).

When the ID value m_id is 0, the message is transmitted from the uses interface subsystem 303 to the operation control subsystem 305 which, in turn, sends the message to the data management subsystem 308 for data retrieval (Steps 521 and 525). That is, control associated with the message is transferred from the operation control subsystem 305 to the data management subsystem 308. In response to the message, the data management subsystem 308 executes data retrieval from the database 309 (Step 529). After completing the data retrieval, the OMS is standby at the idle state (Step 530). When the ID value m_id is 3, the message is transmitted from the user interface subsystem 303 to the OMS management subsystem 307 (Step 522). In response to the message, the OMS management subsystem 307 monitors current state of the OMS and executes a required processing (Step 526). Thereafter, the OMS is standby at the idle state (Step 531).

At the ID value m_id of 4, the control associated with the message is transferred to the target interface subsystem 304 because this ID value means that the message is associated with data which has been processed or will be processed in the target system (Step 523). The target interface subsystem 304 transmits the message to the target system through the HIFU board 302 (Step 527). Following the step 527, the OMS is standby at the idle state (Step 532).

The ID value m_id of 1 means that the message is not associated with the target system, but associated with the SIGNOS. At the ID value m_id of 1, accordingly, control associated with the message is transferred to the SIGNOS interworking subsystem 306 (Step 524). The SIGNOS interworking subsystem 306 formats the message into the form compatible with the SIGNOS and then outputs the resultant message (Step 528). Following the step 528, the OMS is standby at the idle state (Step 533).

The above procedure is usually started at the idle state of the OMS (Step 501) and ended at the idle state of the OMS (one of Steps 516 to 518 and Steps 530 to 533). After completing this procedure, the OMS operates under a condition that it is connected to a physical input/output device.

As apparent from the above description, the present invention provides a method for controlling an OMS in an SMX-1 system, capable of achieving an efficient operation of the OMS.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an operation and management subsystem(OMS) in a signalling message exchange No.1 system(SMX-1), the OMS including a user interface subsystem(UIS), a target interface subsystem(TIS), an operation control subsystem(OCS), an interworking subsystem of a signalling network operation system(SIGIS), a management subsystem of the operation and management subsystem(OMSMS) and a data management subsystem (DMS), comprising the steps of:

(a) when the OMS being at an idle state receives a message from the SMX-1 via a highway interface unit(HIFU), transmitting the message to the TIS, deciding which subsystem the message is to be transmitted to based on a module identifier value of the message, converting the message into a format compatible with the decided subsystem and outputting the converted message to the decided subsystem;

(b) when the identifier value is 1 at the step (a), outputting the converted message to the SIGIS, reconverting the converted message into a format compatible with a signalling network operations system(SIGNOS) and outputting the reconverted message to the SIGNOS;

(c) when the identifier value is 0 at the step (a), outputting the converted message to the OCS, reconverting the converted message into a format compatible with a database equipped in the OMS and storing the reconverted message into the database;

(d) when the identifier value is 2 at the step (a), outputting the converted message to the UIS, formatting the converted message into a format compatible with a printer or a user and outputting the formatted message to the printer or the user;

(e) when the OMS being at an idle state receives a message from an operation and management worksite (OMW), transmitting the message to the UIS, deciding which subsystem the message is to be transmitted to based on a module identifier value of the message, converting the message into a format compatible with the decided subsystem and outputting the converted message to the decided subsystem;

(f) when the identifier value is 0 at the step (e), transmitting the converted message to the DMS via the OCS, retrieving data of the database by the DMS;

(g) when the identifier value is 3 at the step (e), outputting the converted message to the OMSMS and monitoring a current state of OMS by the OMSMS;

(h) when the identifier value is 4 at the step (e), outputting the converted message to the SMX-1 via the HIFU; and (i) when the identifier value is 1 at the step (e), outputting the converted message to the SIGIS, reconverting the converted message into a format compatible with the SIGNOS and outputting the reconverted message to the SIGNOS.

* * * * *